(12) United States Patent
Kaneko

(10) Patent No.: US 10,725,449 B2
(45) Date of Patent: Jul. 28, 2020

(54) MANAGEMENT DEVICE, CONTROL DEVICE, MANAGEMENT SYSTEM, CONTROL METHOD, AND STORAGE MEDIUM

(71) Applicant: CANON KABUSHIKI KAISHA, Tokyo (JP)

(72) Inventor: Shuhei Kaneko, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 198 days.

(21) Appl. No.: 15/290,909

(22) Filed: Oct. 11, 2016

(65) Prior Publication Data

US 2017/0108849 A1 Apr. 20, 2017

(30) Foreign Application Priority Data

Oct. 14, 2015 (JP) ................. 2015-203186

(51) Int. Cl.
*G05B 19/408* (2006.01)
*G05B 19/406* (2006.01)
*B29C 64/386* (2017.01)
*B33Y 50/02* (2015.01)

(52) U.S. Cl.
CPC ......... *G05B 19/408* (2013.01); *G05B 19/406* (2013.01); *B29C 64/386* (2017.08); *B33Y 50/02* (2014.12); *G05B 2219/35134* (2013.01); *G05B 2219/49007* (2013.01); *G05B 2219/49023* (2013.01)

(58) Field of Classification Search
CPC ... B29C 67/0088; B33Y 50/02; G05B 19/408; G05B 2219/35134; G05B 2219/49007
See application file for complete search history.

(56) References Cited

U.S. PATENT DOCUMENTS

| 7,389,057 | B2* | 6/2008 | Yamaguchi | ........ H04N 1/00002 399/8 |
| 2003/0229691 | A1* | 12/2003 | Ishimoto | ............. H04L 29/1215 709/223 |
| 2004/0172469 | A1* | 9/2004 | Takahashi | ........... H04L 43/0817 709/224 |
| 2007/0201077 | A1* | 8/2007 | Morales | ................ G06F 3/1214 358/1.15 |
| 2007/0266424 | A1* | 11/2007 | Haaf | ...................... G03G 15/55 726/4 |

(Continued)

FOREIGN PATENT DOCUMENTS

JP 2007-37093 A 2/2007
JP 2015-507250 A 3/2015

*Primary Examiner* — Michael J Huntley
(74) *Attorney, Agent, or Firm* — Canon U.S.A., Inc. IP Division

(57) ABSTRACT

A management device manages information on a control device configured to build a three-dimensional object and acquires from the control device that is a management target of the management device, device information including a status detected in the control device that is the management target, via a network. The management device analyzes the acquired device information in determination of an error based on the detected status and an output mode for outputting the error. The management device issues a notification including the error in the control device that is the management target based on an analysis result.

14 Claims, 10 Drawing Sheets

(56) References Cited

U.S. PATENT DOCUMENTS

| | | | | |
|---|---|---|---|---|
| 2010/0079793 | A1* | 4/2010 | Nishikawa | G06F 8/65 358/1.15 |
| 2010/0153487 | A1* | 6/2010 | Greven | G06Q 10/06311 709/203 |
| 2011/0172961 | A1* | 7/2011 | Sunata | G06F 11/0733 702/179 |
| 2012/0084606 | A1* | 4/2012 | Igarashi | G03G 15/5079 714/37 |
| 2014/0068597 | A1* | 3/2014 | Hirahara | G06F 8/65 717/173 |
| 2015/0190966 | A1* | 7/2015 | Griszbacher | B29C 67/0088 264/40.6 |
| 2015/0190968 | A1* | 7/2015 | Griszbacher | B33Y 10/00 264/40.6 |
| 2016/0170388 | A1* | 6/2016 | Haas | G05B 15/02 700/9 |
| 2016/0185044 | A1* | 6/2016 | Leonard | B29C 67/0088 700/98 |

* cited by examiner

FIG. 4

```
401 ~ {
        "3d-printer-settings": {
            "printer-head-temperature":"180-220",
            "printer-bed-temperature":"",
            "printer-fan-speed":"80",
        }
402 ~   "3d-printer-capabilities": {
            "printer-head-temperature-supported":"80-250",
            "printer-bed-temperature-supported":"100-200",
            "printer-fan-speed-supported":true
        }
403 ~   "3d-printer-statuses": {
            "printer-head-temperature-current":"200",
            "printer-bed-temperature-current":"210",
            "printer-fan-speed-current":"80",
        }
404 ~   "3d-printer-state-reasons": {
            "extruder-failure":"An extruder has failed and requires maintenance or replacement.",
            "material-empty":"One or more build materials need to be loaded for a processing."
        }
    }
```

FIG.6

ERROR ANALYSIS SETTING

○ DO NOT PERFORM ERROR ANALYSIS

◉ PERFORM ERROR ANALYSIS

ANALYSIS SETTING

601 — ◉ PERFORM ERROR ANALYSIS FOR EACH EVENT

602 — ○ ANALYZE ERROR INFORMATION INCLUDING Keyword

[          ]

603 — ○ ANALYZE ERROR INFORMATION NOT INCLUDING Keyword

[          ] [SET]

604 — DETERMINATION SETTING
- ☐ CHECK MATERIAL
- ☒ CHECK Printer-head TEMPERATURE
- ☒ CHECK Printer-bed TEMPERATURE
- ☒ CHECK FAN SPEED
- ☐ CHECK PRINTING SPEED
- ☐ CHECK MATERIAL EXTRUSION SPEED

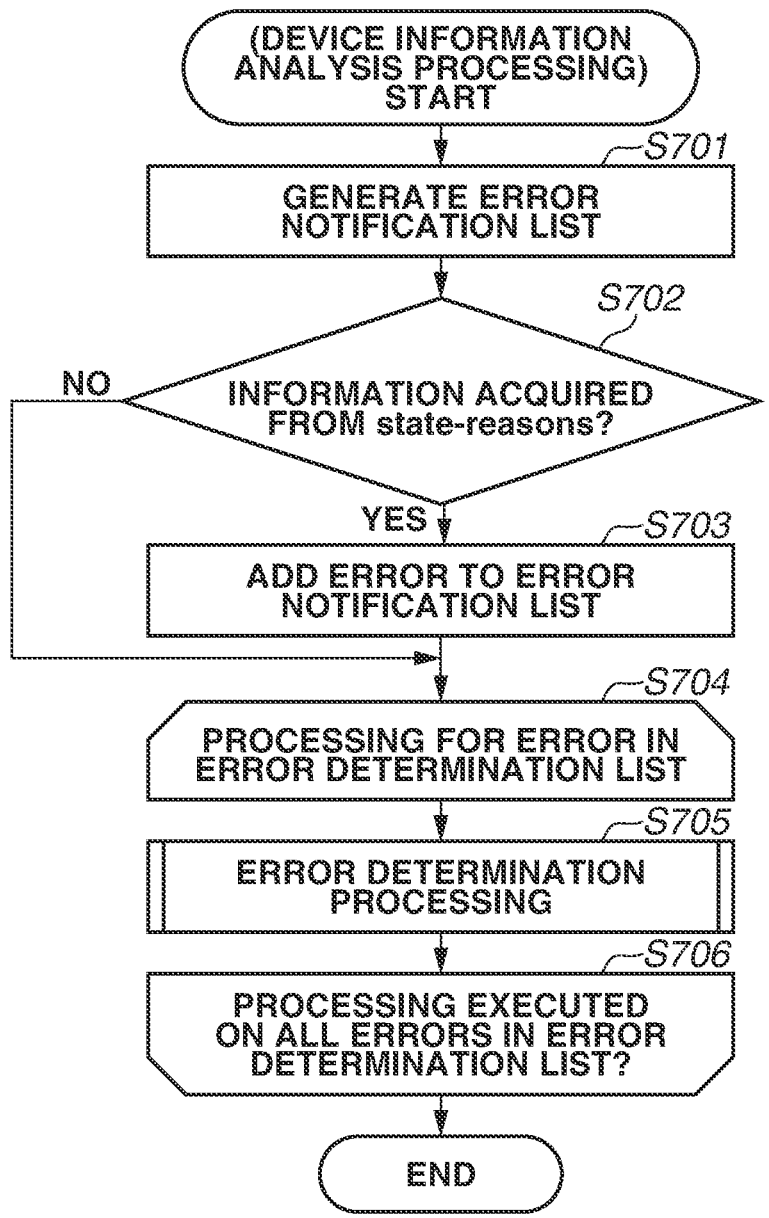

FIG.8A

| ErrorCode | Message | Settings | Capabilities | Statuses | Position | Flag |
|---|---|---|---|---|---|---|
| material-mismatch | Mismatch printer material. | materials-col | materials-col-supported | materials-col-ready | Material | False |
| head-temperature-error | Irregular head temperature. | printer-head-temperature | printer-head-temperature-supported | printer-head-temperature-current | Printer-head | True |
| bed-temperature-error | Irregular bed temperature. | printer-bed-temperature | printer-bed-temperature-supported | printer-bed-temperature-current | Printer-bed | True |
| fan-speed-error | Irregular fan speed. | printer-fan-speed | printer-fan-speed-supported | printer-fan-speed-current | Fan | True |
| print-speed-error | Irregular print speed. | print-speed | print-speed-supported | print-speed-current | Printer-head | False |
| filament-speed-error | Irregular print speed. | printer-fan-speed | printer-fan-speed-supported | printer-fan-speed-current | Printer-head | False |

| ErrorCode | SubCode | Message |
|---|---|---|
| extruder-failure-error | extruder-failure | An extruder has failed and requires maintenance or replacement. |
| material-empty-error | material-empty | One or more build materials need to be loaded for a processing. |
| bed-temperature-error | null | Irregular bed temperature. |

811 812 813

MANAGEMENT DEVICE, CONTROL DEVICE, MANAGEMENT SYSTEM, CONTROL METHOD, AND STORAGE MEDIUM

BACKGROUND OF THE INVENTION

Field of the Invention

The present disclosure generally relates to control and, more particularly, to a management device, a control device, a management system, a control method, and a storage medium related to a notification of an error in a control device that builds a 3-dimensional (3D) object.

Description of the Related Art

In recent years, a 3D printer has rapidly gained popularity. The 3D printer is a popular term for a control device that builds a 3D object based on model data. Techniques related to 3D printing are sometimes referred to as additive manufacturing (AM). On the other hand, a 2-dimensional (2D) printer is a printing device that performs 2D printing on paper (sheet).

The 3D printers have been available for some time, but have only been used in limited types of industry and applications. This is because the 3D printers have been large, have required dedicated/special facilities and materials, and have been difficult to handle. Recent technical advancement has led to development and practical use of various new methods for building an object including Fused Deposition Modeling (FDM), Stereo Lithography (STL), Selective Laser Sintering (SLS), and an inkjet method. As a result, now a user can select a wide range of 3D printers, from inexpensive 3D printers available for general customers to high-spec professional 3D printers for manufactures and companies in various industries.

Furthermore, there have recently been various attempts to commercialize 3D printing services. A company providing the 3D printing services receives from the user 3D model data representing an object to be built, designation of a material for the printing, and the like, and builds an object with a 3D printer on behalf of the user. Such a company providing the 3D printing services manages various types of 3D printers to be capable of handling various build methods and types of materials for various user needs.

For 2D printers, management systems have conventionally been available for managing a 2D printer as a management target. In such a management system, status and error information collected from the 2D printer are managed and analyzed to provide various services to a user of the 2D printer. Examples of the service thus provided include a maintenance service for a 2D printer under failure. When error information is acquired from a 2D printer that is a management target, the management system transmits an error notification to an administrator. This error notification is based on the acquired error information. Thus, the administrator that has received the error notification can take an appropriate action for the failure of the 2D printer.

Japanese Patent Application Laid-Open No. 2007-37093 discusses one conventional management system for a 2D printer. In the system, device information is acquired from the 2D printer with a message using the Simple Network Management Protocol (SNMP) as a standardized protocol. Specifically, Management Information Base (MIB) information is acquired as the device information from the 2D printer by using SNMP. The MIB information is information made accessible by a network device such as the 2D printer managed by SNMP, so that external devices can recognize an operation status of the 2D printer. The MIB information includes identification information, status information, and capability information of the network device. When an error occurs in the 2D printer of the management target, the management system can recognize the content of the error such as paper jam, based on information on prtAlertCode in the MIB.

In recent years, the 3D printer industry has been considering to establish a standardized protocol with Internet Printing Protocol (IPP), so that the device information on a 3D printer is acquired by using the protocol. The device information acquired by using the IPP includes a status detected in the 3D printer and an error output based on the detected status. Unfortunately, the type of error that can be acquired by using the IPP is limited. Thus, any type of error that is not supported by the IPP is currently being notified as an "unknown error". Furthermore, there is a case where the content of the device information that can be acquired by using the IPP might differ among 3D printers. All things considered, a typical standard protocol, such as the SNMP described above as a conventional technique, has not yet been established in the 3D printer industry.

In practice, for example, a unique method, different from the IPP, is employed for each manufacturer and model of the 3D printer. This means that determination of an error having occurred in the 3D printer and a method of outputting the error might be different among different manufactures and models. Thus, the statuses detected by a plurality of 3D printers might have the same content but the content of notifications might be different among the 3D printers.

Specifically, one 3D printer might issue a notification indicating an error due to a low temperature of a head, through which a material is extruded, with a message "head temperature needs to be higher". Meanwhile, another 3D printer might issue a notification indicating the same error with a message "error has occurred in head" simply indicating an error in the head. This situation is cumbersome for the administrator, because he or she has to recognize the difference between different notifications of the error based on the same status. Thus, the administrator might even perform a wrong action. More specifically, with the message that "head temperature needs to be higher", the administrator can simply wait until the head temperature rises, but with the message indicating the error in the head, the administrator might replace the head.

SUMMARY OF THE INVENTION

The present disclosure is directed to a system for standardizing a content of a notification of an error to be common to a plurality of control devices that builds 3D objects, more particularly, to a plurality of control devices different from each other in determination of an error based on a status detected in the control device and an output mode for outputting the error.

According to an aspect of the present disclosure, a management device configured to manage information on a control device configured to build a three-dimensional object includes an acquisition unit configured to acquire from the control device that is a management target of the management device, device information including a status detected in the control device that is the management target, via a network, an analysis unit configured to analyze the device information acquired by the acquisition unit in determination of an error based on the detected status and an output mode for outputting the error, and a notification unit configured to issue a notification including the error in the control device that is the management target based on an analysis result.

Further features of the present disclosure will become apparent from the following description of exemplary embodiments with reference to the attached drawings.

BRIEF DESCRIPTION OF THE DRAWINGS

FIG. 4 is a diagram illustrating an example of device information.

FIG. 6 is a diagram illustrating an example of an error analysis setting screen user interface (UI).

FIG. 7 is a flowchart illustrating an example of a flow of error analysis processing.

FIGS. 8A and 8B are each a diagram illustrating an example of an error determination list.

DESCRIPTION OF THE EMBODIMENTS

Hereinafter, exemplary embodiments of the present disclosure will be described in detail below with reference to the drawings.

Figure 1:
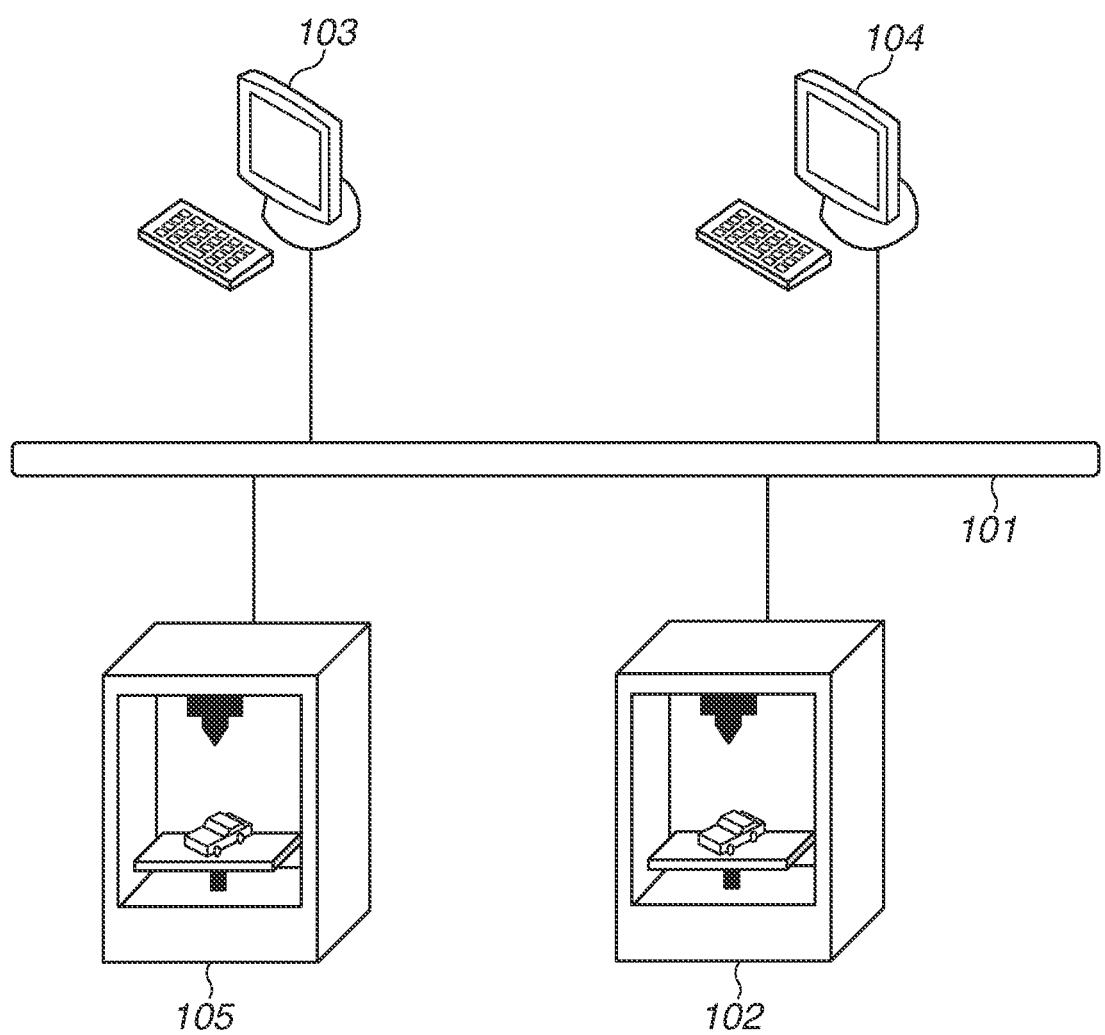
FIG. 1 is a diagram illustrating an example of a configuration of a system according to the exemplary embodiment of the present disclosure.

FIG. 1 illustrates an example of a system configuration of a management system according to an exemplary embodiment of the present disclosure.

A network 101 includes an intranet, a local area network (LAN), and the like. 3D printers 102 and 105 are each an example of a control device that builds a 3D object based on special model data. The 3D printers 102 and 105 are different models. A computer 103 is a client computer with build control software installed. A computer 104 is a management device on which a 3D printer management application operates. The computers 103 and 104 may each be a personal computer (PC), a tablet computer, a smartphone, or the like.

The 3D printers 102 and 105 and the computers 103 and 104 can transmit and receive information to and from each other. The 3D printers 102 and 105, each serving as the control device, are managed by the computer 104 via the network 101. The network 101 may be a wireless network such as a wireless LAN, or may be a public network such as the Internet as long as information can be transmitted and received.

Figure 2:
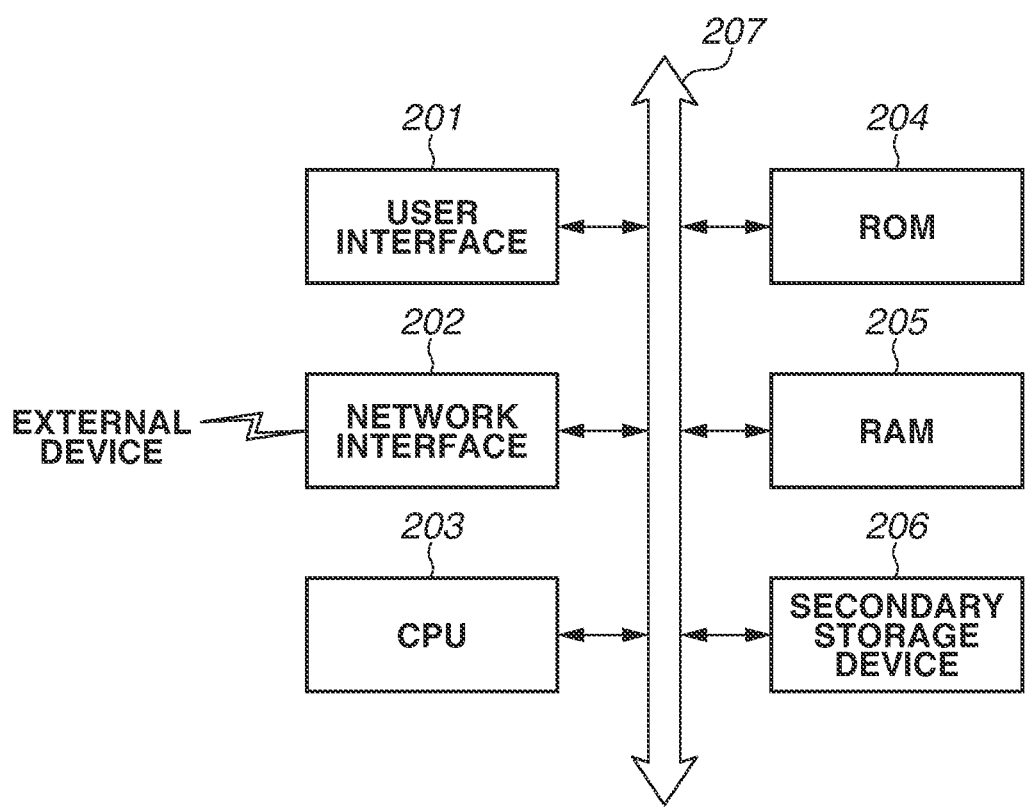
FIG. 2 is a diagram illustrating an example of a hardware configuration of an information processing function.

FIG. 2 is a diagram illustrating an example of a hardware configuration of an information processing function of each of the 3D printers 102 and 105 and the computers 103 and 104. In the 3D printers 102 and 105, the hardware configuration of the information processing function illustrated in FIG. 2 corresponds to a configuration of an embedded computer 312 illustrated in FIG. 3 described below and the like.

A user interface (hereinafter, referred to as UI) 201 is in charge of receiving and outputting information and signals with a display, a keyboard, a mouse, a touch panel, a button, and the like. A computer without such hardware can be accessed and operated by another computer with a remote desktop, remote shell, and the like.

A network interface 202 is connected to a network such as a LAN and communicates with another computer and a network device. A read only memory (RAM) 204 stores therein an embedded program and data. A random access memory (RAM) 205 is a temporary memory area. A secondary storage device 206 is a hard disk drive (HDD), a flash memory, or the like. A central processing unit (CPU) 203, which may include one or more processors and one or more memories, executes a program read from the ROM 204, the RAM 205, the secondary storage device 206, and the like. The components 201 to 206 are connected to each other via an input/output interface 207. As used herein, the term "unit" generally refers to hardware, firmware, software or other component, such as circuitry, alone or in combination thereof, that is used to effectuate a purpose.

The 3D printers 102 and 105 each further includes a hardware configuration specific to a build method. A specific example of the hardware configuration specific to a build method is an engine unit of the 3D printer 102. The engine unit includes a CPU and a storage device such as a ROM and a RAM, and further includes hardware specific to a build method controlled by the CPU. For example, when FDM is employed, the hardware includes a printer head (head or extruder), a motor that drives a stage and the printer head in X, Y, and Z axis directions, a heater that heats a nozzle of the printer head, a fan used for cooling and for supplying and discharging air, and the like. Other examples of the build method include stereo lithography (STL), Selective Laser Sintering (SLS), and an inkjet method. The 3D printers 102 and 105 each include a plurality of sensors (not illustrated) for detecting a status. Specific examples of the sensor include a temperature sensor for detecting a temperature status of the printer head.

Figure 3:
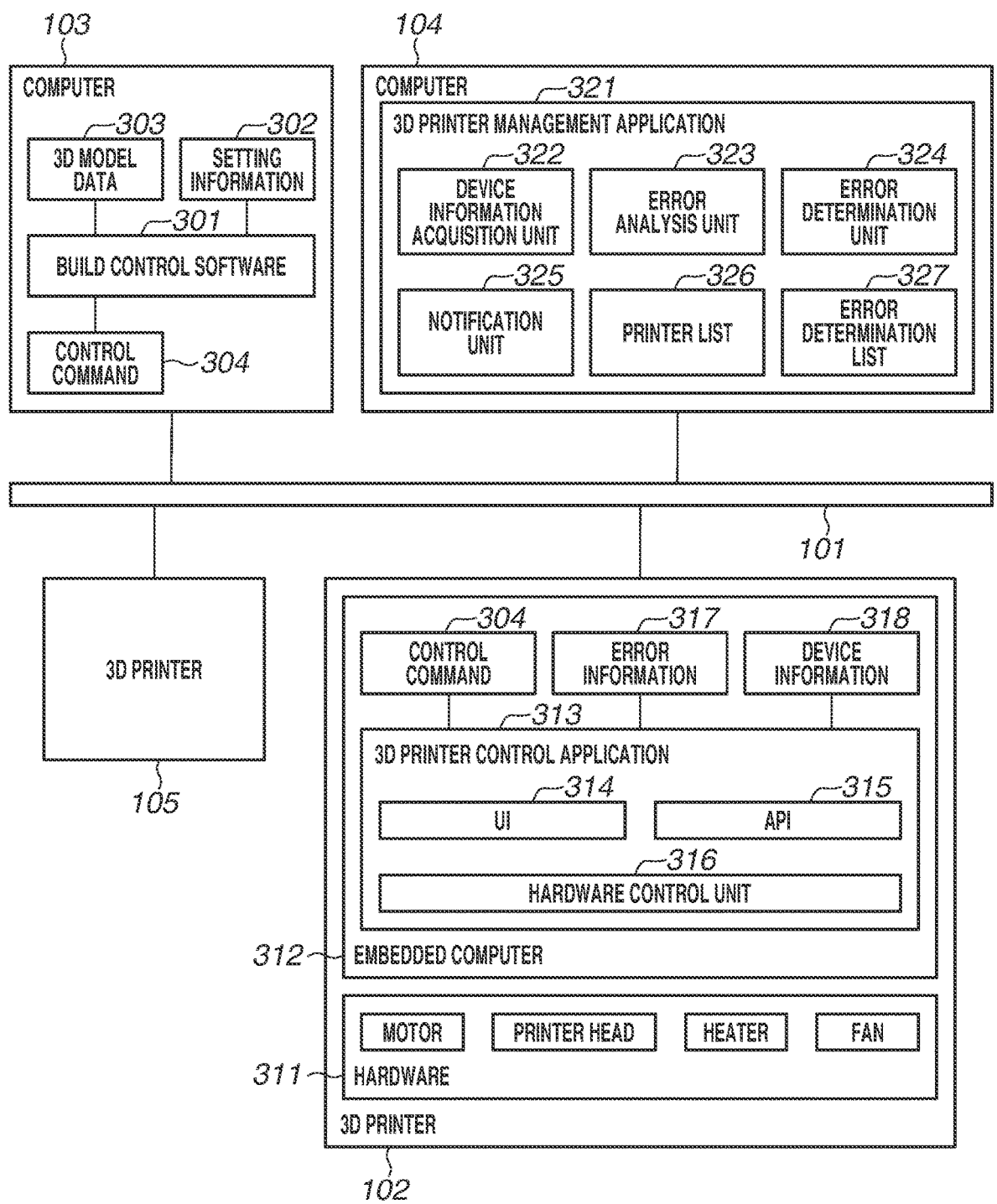
FIG. 3 is a diagram illustrating an example of software and hardware configurations of the system.

FIG. 3 is a diagram illustrating an example of software and hardware configurations of the system.

First of all, a configuration of the computer 103 is described.

In the present exemplary embodiment, a configuration is described in which the computer 103 generates a print job for the 3D printers 102 and 105, and the computer 104 manages the 3D printers 102 and 105. Alternatively, a single computer may be in charge of generating a print job and managing the 3D printers.

Build control software 301 is software installed and executed by the computer 103, and includes software called slicer having a function of performing setting and generating a control instruction for building an object.

Setting information 302 is the setting information for building an object and is set by the build control software 301 and the like. Examples of setting items for building an object include a model name of a 3D printer to be used, a temperature of a component such as a printer head, a type and a name of a material to be used, fill pattern, and the like.

3D model data 303 represents a 3D shape of an object desired to be built by the user. The 3D model data 303 includes STL that is one of file formats for storing data representing the 3D shape.

A control instruction 304 is a control instruction for a 3D printer generated by the build control software 301 based on the 3D model data 303. One example of a widely used format of the control instruction is G-code that is an instruction for a machine tool expanded to be used for 3D printers. The build control software 301 generates the control instruction for building an object portion as a build portion represented by the 3D model data 303, and also generates a control instruction for building support structures for building the object portion.

The build control software 301 converts the 3D model data 303 into the control instruction 304 executable by the 3D printer 102, based on a setting value selected by a user from the setting information 302.

The build control software 301 has a function of generating a job history including the setting information 302, the control instruction 304, and the like, and a function of transmitting the job history to the computer 104. The function of generating a job history and the function of transmitting the job history to the computer 104 may be added to general build control software as a plugin program and the like. Alternatively, an application (unillustrated program) having the function of generating a job history and the function of transmitting the job history to the computer 104 may be separately installed in the computer 103, and implement the functions. Such an application collects information on a job from the build control software 301, an execution result from the 3D printer 102, and the like to generate a job history.

Next, a configuration of the 3D printer 102 is described.

Hardware 311 corresponds to an engine unit of the 3D printer 102, and is specific to a build method. For example, when FDM is employed, the hardware 311 includes a printer head, a motor that drives a stage and the printer head in X, Y, and Z axis direction, a heater that heats a nozzle of the printer head, a fan used for cooling, and the like.

The embedded computer 312 is a computer embedded in the 3D printer 102. The embedded computer 312 is different from a general computer in that it is dedicated for a desired function, and thus has no unnecessary function, capability, or part so as to be manufactured at a low cost. The embedded computer 312 may be a general computer depending on a function and a capability used in the 3D printer.

A 3D printer control application 313 is an application executed on the embedded computer 312. The 3D printer control application 313 includes a user interface 314, an application programming interface (API) 315, and a hardware control unit 316.

The UI 314 may be a low-cost interface obtained by a combination of a display that only displays several lines of characters and hardware operation buttons. Alternatively, the UI 314 may be a display provided with a touch panel or the like. A user checks the state of the 3D printer with the content displayed on the UI 314, and operates the UI 314 to instruct the 3D printer to execute desired processing.

The API 315 is in charge of transmitting and receiving an instruction and data to and from the computers 103 and 104 that are external devices. The 3D printer 102 is controlled with an instruction transmitted from the computers 103 and 104 serving as the external devices to the 3D printer control application 313 via the API 315.

A hardware control unit 316 operates components of the hardware 311 in accordance with the instruction received through the UI 314 or the API 315, and an instruction issued by the 3D printer control application 313, to output an object, execute pre-/post processing executed before/after outputting the object, and perform the other like operations.

The control instruction 304 generated by the build control software 301 is transmitted to the 3D printer control application 313 via the network 101 and the API 315. Alternatively, the control instruction 304 generated by the computer 103 may be transmitted to the 3D printer control application 313 via the computer 104. When the 3D printer 102 includes no network interface, the control instruction 304 may be transmitted to the 3D printer control application 313 via a storage device such as a universal serial bus (USB) memory.

With an output instruction from the UI 314 or the API 315, the 3D printer control application 313 interprets the control instruction 304, and the hardware control unit 316 operates the components of the hardware 311 to output an object.

Error information 317 is information indicating an error corresponding to a predetermined state and failure detected based on a definition unique to the 3D printer 102. Output management for the content of the error, a method of notifying the error, and the like is performed in accordance with the definition of the 3D printer 102. The error information 317 is not necessarily used. In the present exemplary embodiment, the error information 317 is acquired by the management application 321 by using a general communication protocol. The content of such an event depends on the model and the manufacturer of the 3D printer, and might not be interpretable by the management application 321.

Device information 318 includes status information on the 3D printer 102. In an example described in the present exemplary embodiment, the device information 318 is information that is defined by and acquirable by using a protocol such as Internet Printing Protocol (IPP) common to various models of 3D printers. The IPP is a protocol, running on a generation communication protocol, for transmitting and receiving print (build) data, for monitoring the printing device, and for performing the other like operations. Another protocol with similar information acquisition definitions may be used instead. In the present disclosure, device information defined by the IPP and by another protocol may be used. Thus, the device information 318 may include pieces of information defined by the protocols. In this configuration, for example, the 3D printer management application 321 can analyze information defined by the IPP that is not supported by some models, or status information undefined by the IPP.

The device information 318 includes various types of information usable for analysis by the 3D printer management application 321 according to the present disclosure. The device information 318 includes setting information related to settings for building an object with the 3D printer, capability information indicating the functions of the 3D printer, a status of the 3D printer, the error information, and the like. The status includes information indicating the status managed as the error information 317 described above, used for determining an error, as well as other statuses. An example of the device information 318 according to the present exemplary embodiment is described below with reference to FIG. 4. In the present exemplary embodiment, the 3D printer management application 321 acquires the device information 318 from the 3D printer 102. The setting information and the capability information may not necessarily be acquired from the 3D printer 102. For example, the setting information may be acquired from the computer 103. The capability information on the 3D printer may be stored in advance in the computer 104 or in an external storage device.

The 3D printer 105 also includes a hardware configuration specific to a build method, as in the case of the 3D printer 102. Furthermore, the 3D printer 105 also includes a 3D printer control application similar to that of the 3D printer 102. Thus, the 3D printer control application runs on the 3D printer 105 to control hardware, and manage the device information and the error information. The 3D printer 102 and the 3D printer 105 each detect an occurrence of an error when a predetermined state or failure is detected in accordance with its unique definition.

The 3D printers 102 and 105 employing the same build method may be different from each other in the hardware configuration and thus might be different from each other in the program including the definition of the type of errors to be detected and the output mode for the errors. Furthermore, the 3D printers 102 and 105 of the same model may be different from each other in the definition of the type of errors to be detected and the output mode for the errors, due to the difference in the version of the program. Examples of the difference in the output mode for the errors include a difference in a portion where the content of an error is displayed, such as a computer screen of the administrator, a panel on the 3D printer, or the like, a difference in a message to be displayed, and the like. The determination of errors and the method of outputting the errors are determined for each manufacturer and model of the 3D printer.

Next, a configuration of the computer 104 will be described.

The 3D printer management application 321 is an application executed on the computer 104 and acquires and manages information on one or a plurality of 3D printers. The 3D printer management application 321 includes a device information acquisition unit 322, an error analysis unit 323, an error determination unit 324, a notification unit 325, a printer list 326, and an error determination list 327.

The device information acquisition unit 322 acquires the error information 317 and the device information 318 from the 3D printer 102. The device information acquisition unit 322 may acquire the information from the 3D printer 102 periodically, or under a predetermined schedule. Alternatively, the information may become acquirable by the device information acquisition unit 322, when an event such as an error occurs in the 3D printer 102 and the 3D printer 102 notifies the computer 104 of the event.

The error analysis unit 323 executes analysis processing on an error occurring in a 3D printer that is the management target, based on the information thus acquired by the device information acquisition unit 322. This analysis processing may be commonly executed for a plurality of 3D printers of different models or from different manufacturers. In the error analysis processing, the error information 317 on an error of a type that can be acquired from an error code is acquired by using the error code. When there is an error of a type that cannot be acquired from an error code, the content of the error is determined based on the device information 318 in error determination processing described below and the like. The analysis processing executed by the error analysis unit 323 is described below with reference to FIG. 7.

When there is an error of a type that cannot be acquired from an error code, the error determination unit 324 determines based on the device information 318 acquired by the device information acquisition unit 322, the content of the error occurring in the 3D printer. Processing executed by the error determination unit 324 is described below with reference to FIG. 9.

The notification unit 325 notifies the user or the administrator of the 3D printer of the error information 317 acquired from the error code by the error analysis unit 323, and the content of the error determined by the error determination unit 324 based on the device information 318. The content of the notification may be displayed on the user interface 201 of the computer 104, or may be transmitted to the administrator with an email.

The printer list 326 offers a list of printers not needing the error determination processing. Although not elaborated in the figures, the printer list 326 stores a printer vender, a printer model code, a printer model name, and the like. Printers corresponding to certain printer venders and models offer a wide range of types of errors acquirable from the error code, and thus do not need error determination processing based on the device information 318. The error code printer list 326 may be stored in advance in the computer 104, read from a setting file, or input from a user through an input unit such as a UI.

The error determination list 327 stores types of errors determined by the error determination unit 324. The information stored in the error determination list 327 may be stored in the ROM 204 as the setting information on the program, or may be read from the setting file. The error determination list 327 is described below with reference to FIG. 8A.

FIG. 4 is a diagram illustrating an example of the device information 318.

In the present exemplary embodiment, the device information 318 defined by a JavaScript Object Notation (JSON) format is described. However, the device information described in the present exemplary embodiment is merely an example for easy understanding of an explanation. Thus, the content and the data format of the device information 318 are not limited to the example illustrated in FIG. 4.

In this example, information 401 (head-temperature) relates to the temperature of a 3D printer head, information 402 (bed-temperature) relates to the temperature of a bed, and information 403 (fan-speed) relates to fan speed.

The head is a printer head (or an extruder) through which a material is extruded. The bed is a printer bed (or a build platform) on which the object being built is placed. The fan is an air blowing machine for lowering the temperature of the object that has been built, or the temperature in the 3D printer.

The 3d-printer-settings 401 is setting information set for building an object. This setting information indicates the settings on the 3D printer set when an object is to be built by the 3D printer, and includes the content of the setting information 302 set by the build control software 301 for building an object and the like. A value of an item that has not been set is empty or false. In the figure, the value of "printer-bed-temperature" is empty, and thus it can be recognized that the temperature of the bed has not been set.

The "3d-printer-capabilities 402" is capability information indicating functions for building an object, that can be provided by the 3D printer. For example, the 3D printer described in the figure can build an object when the temperature of the bed is in a range between 100° C. and 200° C. A value of the item representing a function that is not provided by the 3D printer is empty or false.

In the 3d-printer-statuses 403, a status indicating the current state of the 3D printer is stored. The current temperature of the 3D printer bed is 210° C.

In the 3d-printer-state-reasons 404, an error code of a currently occurring error in the 3D printer is set. In the present exemplary embodiment, information in the 3d-printer-state-reasons 404 is described as an example of the error output by using a common protocol. The information in the 3d-printer-state-reasons 404 can be acquired in a form of a list of Keys (error codes)-Values (messages). In the illustrated example, the 3d-printer-state-reasons 404 indicates a state where errors "extruder-failure" and "material-empty" are occurring. Here, a bed temperature error cannot be determined and output by the 3D printer.

Figure 5A:
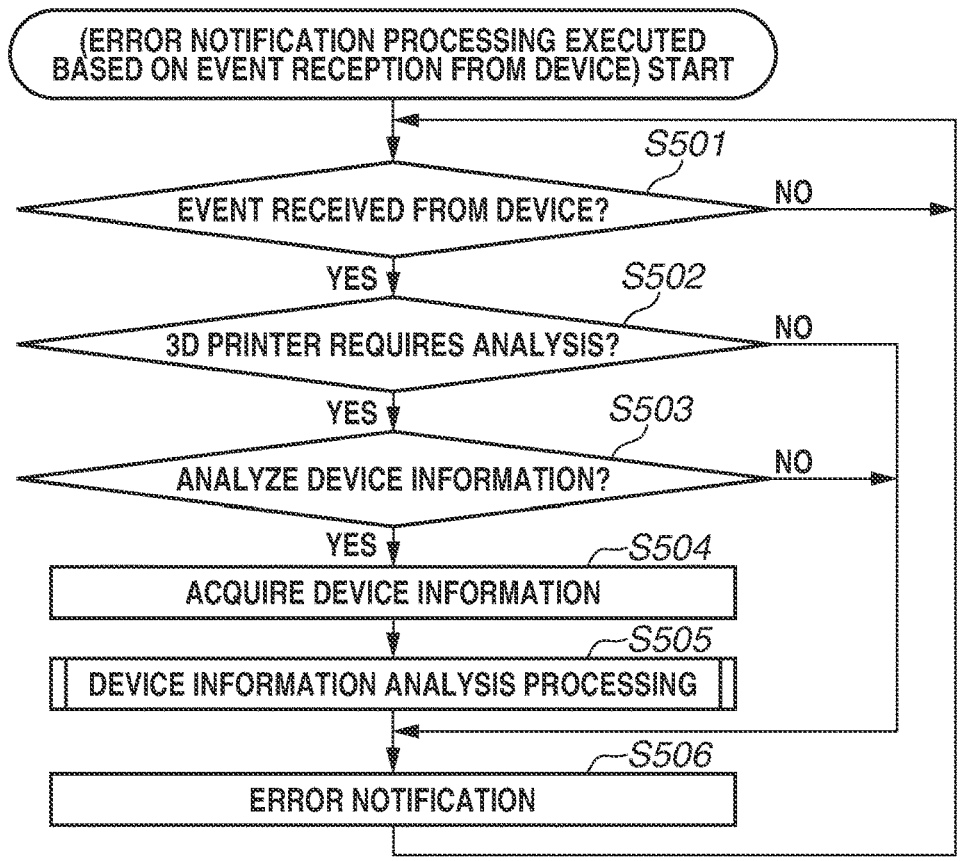
FIG. 5A is a flowchart illustrating a flow of error notification processing executed based on reception of an event from a device.
Figure 5B:
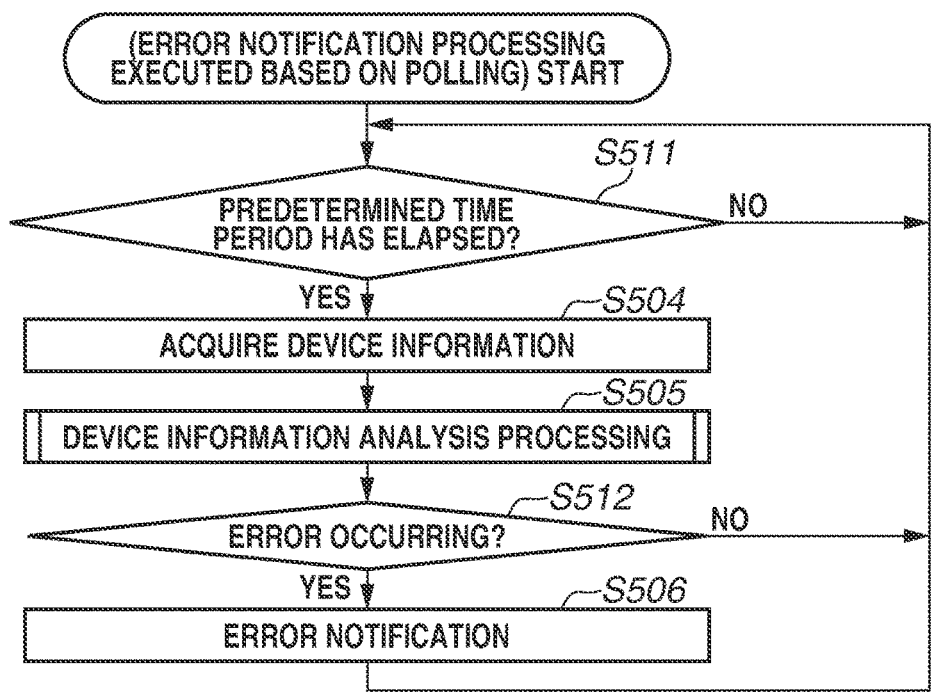
FIG. 5B is a flowchart illustrating an example of a flow of error notification processing executed based on polling.

FIGS. 5A and 5B each are a flowchart illustrating a flow of error notification processing. In the illustrated processing, the 3D printer management application 321 (hereinafter, referred to as the management application 321) acquires the error information 317 and the device information 318 from the 3D printer 102, and issues a notification of an error based on the result of the analysis. The processing in the flowchart starts when the 3D printer management application 321 is executed, and is repeatedly executed until the 3D printer management application 321 is terminated.

The error notification processing executed when the management application 321 receives an event from the 3D printer 102 is described with reference to FIG. 5A.

In step S501, when the management application 321 receives the event from the 3D printer 102 (Yes in step S501), the processing proceeds to step S502. As long as the management application 321 does not receive the event (No in step S501), the processing stays in step S501. The error information 317 may be transmitted together with the event. Alternatively, the device information acquisition unit 322 that has received the event may acquire the error information 317 and the like from the 3D printer 102. In the present exemplary embodiment, a case is described where the error information 317 is acquired together with the event. For example, the error information 317 is acquired by the management application 321 by using a general communication protocol. The content of the event depends on the model or the vender of the 3D printer, and thus might not be interpretable by the management application 321.

The present disclosure can also be applied to notification of an event (such as a change in state) in the 3D printer that is not an error but is a target of notification.

In step S502, the management application 321 determines whether the device information 318 of the 3D printer is in the printer list 326. When the 3D printer is not in the printer list 326 (No in step S502), the 3D printer is determined as a 3D printer that uses the analysis and the processing proceeds to step S503. When the 3D printer is in the printer list 326 (Yes in step S502), the 3D printer is determined as a 3D printer that does not need the analysis and the processing proceeds to step S506. In step S506, the management application 321 notifies the administrator of the error received in step S501.

In step S503, the administrator selects whether to analyze the error on an error analysis setting screen illustrated in FIG. 6. When the administrator makes a selection so that the analysis is not to be performed in step S503 (No in step S503), the processing proceeds to step S506. In step S506, the management application 321 notifies the administrator of an error corresponding to the event received in step S501. On the other hand, when the administrator makes a selection so that the analysis is to be performed in step S503 (Yes in step S503), the processing proceeds to step S504.

Thus, whether to analyze the error may be determined based on conditions (analysis setting, determination setting) illustrated in FIG. 6 described below. The setting screen illustrated in FIG. 6 may not be displayed by the management application 321 at the timing of step S503, and may be provided in such a manner that the administrator can perform the setting in advance.

Analysis settings 601 to 603 are described below. The analysis setting 601 is selected for performing error analysis processing (steps S504 and S505) each time the error occurrence event is received.

The analysis setting 602 is selected for executing the error analysis processing (steps S504 and S505) when the error information 317 includes a Keyword set by the administrator. For example, the administrator may set "UNKNOWN" as the Keyword. In this case, the error analysis processing is executed, that is, the processing proceeds to steps S504 and S505, when the error information 317 is "UNKNOWN ERROR", and the processing proceeds to step S506 when the error information 317 is "SYSTEM ERROR".

The analysis setting 603 is selected for executing the error analysis processing when the error information 317 does not include a Keyword set by the administrator. The analysis setting 603 is selected for executing the error analysis processing (steps S504 and S505) when the error information 317 does not include a Keyword set by the administrator. For example, the administrator may set "EXTRUDER" as the Keyword. In this case, the error analysis processing is executed, that is, the processing proceeds to steps S504 and S505, when the error information 317 is "SYSTEM ERROR", and the processing proceeds to step S506 when the error information 317 is "EXTRUDER ERROR".

Determination settings 604 enables the administrator to set items for error determination, and are used for the error analysis processing in step S505.

In the present exemplary embodiment, the case is described where the administrator can select whether to perform the error analysis by using the screen illustrated in FIG. 6. Alternatively, the error analysis setting screen may not be presented, and the error analysis may be executed each time the event is received. In step S504, the device information acquisition unit 322 acquires the device information 318 from the 3D printer 102. For example, the device information acquisition unit 322 acquires the device information 318 by using a protocol such as the IPP. The device information acquisition unit 322 may use any other protocol, other than the IPP, with which information corresponding to the device information 318 including the status information can be transmitted and received.

In step S505, the management application 321 executes the error analysis processing based on the device information 318 acquired in step S504. The error analysis processing in step S505 is described in detail with reference to a flowchart in FIG. 7 described below. In step S506, the notification unit 325 notifies the administrator of the error information.

The management application 321 may store images of the 3D printer under failure, and detect an abnormality related to the 3D printer 102 or an object being built from a monitoring image acquired from the 3D printer 102 while the object is being build, by using a general-purpose technique such as similar image retrieval. Thus, the processing in step S502 and the subsequent processing may be executed when the abnormality is detected from the monitoring image.

Error notification processing in a case where the management application 321 acquires the device information 318 from the 3D printer 102 based on polling and the like is described with reference to FIG. 5B. The device information 318 may be acquired by the management application 321 at a timing determined by a schedule set in advance.

In step S511, the management application 321 determines whether a predetermined period of time has elapsed after the information has been previously acquired from the 3D printer 102. When the predetermined period has elapsed (Yes in step S511), the processing proceeds to step S504. The interval of acquiring the information from the 3D printer 102 may be set in the default setting, or a setting value of the interval may be registered or be changeable through reading the setting file, by the user with the UI.

In step S504, the device information acquisition unit 322 acquires the device information 318 from the 3D printer 102.

In step S505, the management application 321 executes the error analysis processing based on the device information 318 acquired in step S504. The error analysis processing executed in step S505 is described with reference to the flowchart in FIG. 7.

In step S512, the management application 321 determines whether the result of the error analysis processing executed in step S505 indicates that the error is occurring. When it is determined that the error is occurring (Yes in step S512), the processing proceeds to step S506. On the other hand, when it is determined that the error is not occurring (No in step S512), the processing returns to step S511.

In step S506, the notification unit 325 notifies the administrator of the error information.

FIG. 7 is a flowchart illustrating the error analysis processing for the 3D printer 102 executed based on the device information 318 acquired from the 3D printer 102. The error analysis processing illustrated in FIG. 7 is commonly executed for a plurality of 3D printers different from each other in model or manufacturer.

In step S701, the error analysis unit 323 generates an error notification list in which an error determined to be occurring in the subsequent error analysis processing is stored. In processing in steps S702 and 704 described below, analysis for a plurality of errors is executed based on the device information 318, and the information determined as an error is added to the error notification list as appropriate. When at least one error is added to the error notification list as a result of the error analysis processing in the flowchart, the notification unit 325 issues a notification.

In step S702, the error analysis unit 323 checks a value of the 3d-printer-state-reasons 404, representing error information (error code) of an error currently occurring in the 3D printer, in the device information 318. When information can be acquired from the 3d-printer-state-reasons 404 (Yes in step S702), the processing proceeds to step S703. On the other hand, when no information is acquired (No in step S702), the processing proceeds to step S704.

In step S703, the error analysis unit 323 adds the information acquired from the 3d-printer-state-reasons 404 to the error notification list generated in step S701.

In steps S704 to S706, the error analysis unit 323 executes processing for errors in the error determination list 327.

In step S705, the error determination unit 324 performs error determination by using values of the 3d-printer-settings 401, the 3d-printer-capabilities 402, and the 3d-printer-statuses 403 in the device information 318. The error analysis unit 323 executes processing in step S704 for the number of times that is the same as the number of errors stored in the error determination list 327. In the present exemplary embodiment, the administer can set the items as the targets of the error determination processing, in the determination setting 604 in the error analysis setting screen illustrated in FIG. 6. The error determination items do not need to be selectable by the administrator, and the determination may be always performed for all the items. The error determination processing is described in detail with reference to a flowchart in FIG. 9 described below.

FIG. 8A is a diagram illustrating an example of the error determination list 327. The error determination list 327 is a list for managing information on errors defined in the system. In the list, the information on each error is stored while being associated with an error message and information referred to for determining whether a value is to be determined as an error. Each item in the error determination list 327 corresponds to information, such as the status, unique to the 3D printer. The error determination list 327 manages items corresponding to special statuses depending on the build method and a hardware configuration used for building an object as much as possible. Examples of the items in the error determination list 327 include the temperature of a head through which a consumable material is extruded, an attrition rate (the number of operated times) of a supporting member for the head, the temperature of the build platform, fan speed, and the type of the consumable material that varies among the build methods employed by the 3D printers. Examples of a consumable material used for building an object with FDM include acrylonitrile butadiene styrene (ABS), polylactic acid (PLA), nylon, polyethylene terephthalate (PET), a water-soluble material dedicated to the support structure, and the like. Examples of a consumable material used for building an object with the inkjet method include photocurable resin, wax, and the like. Materials used for building an object with SLS include powder of nylon, metal, and the like. Consumable materials used for STL include special photocurable resin. Some 3D printers use special powder such as plaster and adhesive to build an object.

ErrorCode 801 is identification information indicating the content of each of various errors. Message 802 is a message displayed when it is determined that a value is determined as the error.

"Settings" 803 indicates an item of setting information to be referred to for determining whether a value is determined to be each of the various errors. More specifically, items described in the 3d-printer-settings 401 are mainly referred.

"Capabilities" 804 indicates an item of capability information of the device to be referred to for determining whether a value is to be determined as each of various errors. More specifically, items described in the 3d-printer-capabilities 402 are mainly referred.

"Statuses" 805 indicates an item of status information of the printer referred to for determining whether a value is to be determined as each of the various errors. More specifically, items described in 3d-printer-statuses 403 are mainly referred.

Position 806 is information indicating a part that may be a cause of an error in the 3D printer. This is unnecessary for determining whether an error is occurring, but may be optionally provided to be used for recognizing the detail of the error.

Flag 807 is information indicating whether an item is to be checked in the error determination. In the present exemplary embodiment, items selected in the determination setting 604 in the setting screen illustrated in FIG. 6 are set as items to be checked in the error determination. The checked item has a True value, and an item that is not checked has a False value. The error determination processing executed in step S705 is executed for the item with the True value in the Flag 807.

When the error determination processing is completed for all the error items selected in the error determination list 327 (Yes in step S706), the error determination processing is completed.

In the present exemplary embodiment, the error determination processing is executed when the error analysis is executed based on the reception of an event from the device, and when the error analysis is executed based on the polling. Alternatively, whether to execute the error determination processing may be determined based on a reliability of the error occurrence. For example, the error determination processing may be always executed when the event notification is received because this means that the error has occurred. On the other hand, when the device information analysis processing is executed based on polling to be periodically executed, the device information analysis processing may be terminated with no error determination processing executed if no information is acquired from 3d-printer-state-reasons 404 in step S702. Alternatively, the error notification may be issued as a result of executing the error determination processing if the analysis processing is executed based the reception of an event. The error notification may not be issued even when the result of the error determination indicates that an error has occurred if the analysis processing is executed based on polling, and the error information may be stored as a log instead of being issued as a notification.

Figure 9:
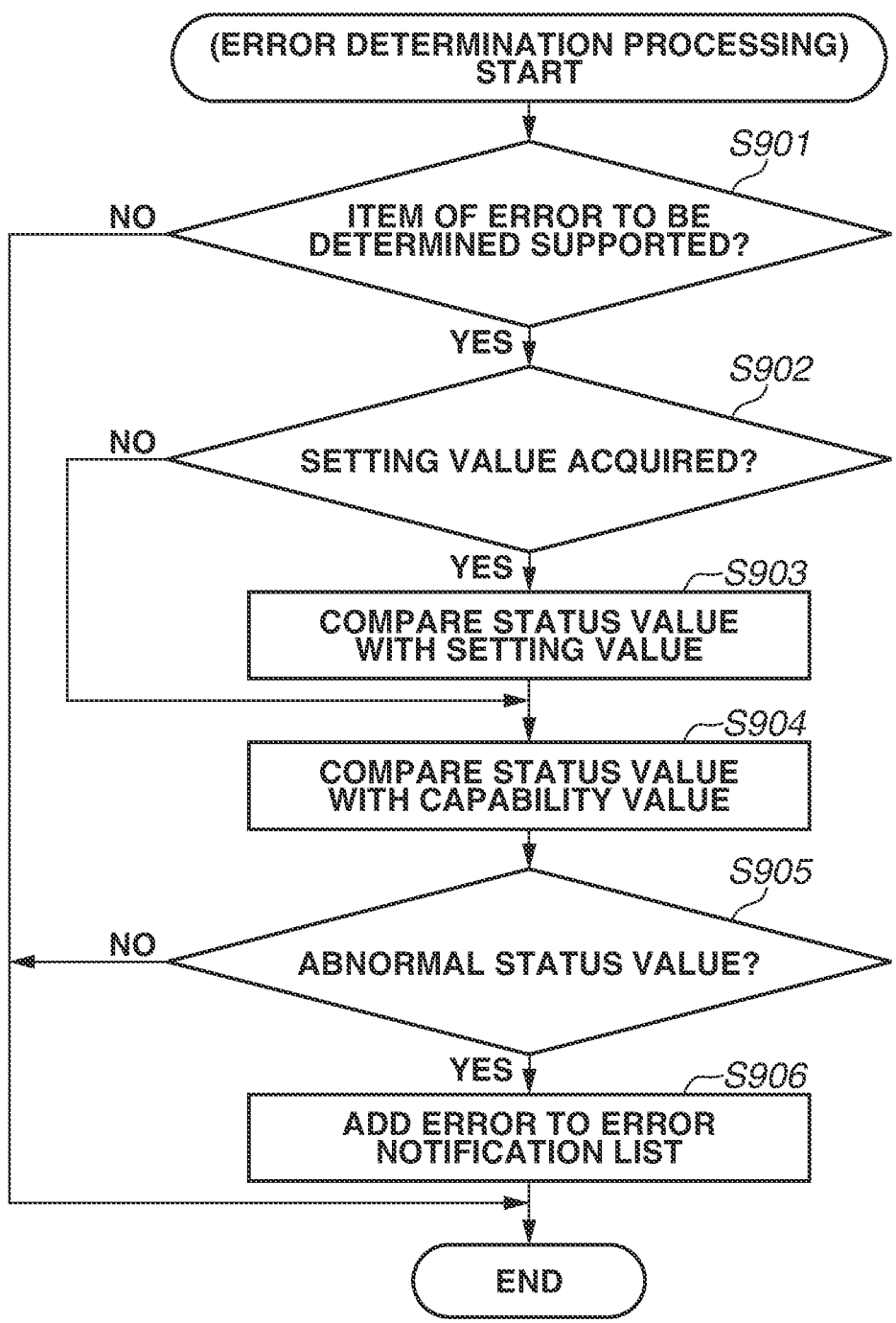
FIG. 9 is a flowchart illustrating an example of a flow of error determination processing.

FIG. 9 is a flowchart illustrating a flow of the error determination processing. More specifically, the processing described below is executed by the error determination unit 324 to determine whether an error in the error determination list 327 is occurring by using information including the status and the like unique to the 3D printer. The determination processing is described with the Settings 803, the Capabilities 804, and the Statuses 805 as examples of the information unique to the 3D printer.

In step S901, the error determination unit 324 acquires a capability value based on the Capabilities 804, and determines whether an error item to be determined is supported by the 3D printer 102. When it is determined that the error item to be determined is supported (Yes in step S901), the processing proceeds to step S902. On the other hand, when it is determined that the error item to be determined is not supported (No in step S902), the processing in this flowchart is terminated.

In step S902, the error determination unit 324 determines whether a value of the setting value for building an object can be acquired based on the Settings 803. When no setting value for building an object has been set (No in step S902), the processing proceeds to step S904. On the other hand, when the setting value for building an object is acquired (Yes in step S902), the processing proceeds to step S903.

In step S903, the error determination unit 324 acquires a status value of the 3D printer based on the Statuses 805, and compares the value thus acquired with the setting value acquired based on the Settings 803 in step S902. Then, in step S904, the error determination unit 324 compares the status value acquired in step S903 with the capability value acquired in step S901.

In step S905, the error determination unit 324 determines whether the status value is within setting ranges defined by the setting information and the capability information, based on the results of the comparison in steps S903 and in S904. When the status value is within the setting ranges and thus is determined as being normal (No in step S905), it is determined that the predetermined condition is satisfied, and the processing is terminated. On the other hand, when the status value is not within the setting ranges defined by the setting information and the capability information (Yes in step S905), the status value is determined as being abnormal and the processing proceeds to step S906. More specifically, the status value that is within the range of the values of the setting information and is within the range of the values of the capability information is determined as a normal value. On the other hand, the status value that is not within the range of the values of the setting information and the range of the values of the capability information is determined as an abnormal value. For example, in the device information 318 illustrated in FIG. 4, information (bed-temperature) related to the bed-temperature, which is one status value indicated by 3d-printer-statuses 403, is out of the values of the capability information indicated by 3d-printer-capabilities 402, and thus is determined as an abnormal value.

The status value may be out of the range of values of the setting information but may be within the range of the values of the capability information. The notification of an error issued in this case indicates that there is no failure related to the 3D printer or building of an object but the object is not being built based on the settings desired by the user. The value includes a numerical value and a character string. The range of values includes one or more values. Thus, the status value within the range of the values of the setting information or the range of the values of the capability information matches one of the values of the setting information or the capability information. The status value is determined to be within the range of the values of the setting information or the range of the values of the capability information, also when the value of the setting information or the capability information is "true" and the status value is a numerical value.

In step S906, the error determination unit 324 determines that the error might be occurring based on the determination in steps S901 to S904, and adds the information on the ErrorCode 801 and Message 802 to the error notification list.

FIG. 8B illustrates an example of the error notification list representing a result of the analysis using the device information 318 illustrated in FIG. 4.

ErrorCode 811 is an error code for identifying the type of an error in the management application 321.

SubCode 812 is a code obtained from the 3d-printer-state-reasons 404 illustrated in FIG. 4. A value of the SubCode 812 of the error added to the error notification list as a result of the error determination processing S705 is "null". Thus, the error obtained from the device information 318 and added to the error notification list can be distinguished from the error added to the error notification list as a result of the error determination processing.

Message 813 is a message output when a notification of the error is issued, and is a message standardized by the management application 321 to be a message common to the 3D printers regardless of their definitions.

The various types of information on the 3D printer acquired for the determination in steps S901 to S904 may be notified as detail information when a notification of the error is issued. With the detail information obtained in the course of the determination displayed as the information, parts of the 3D printer that have no failure can be recognized so that the fault isolation can be facilitated.

Figure 10:
FIG. 10 is a diagram illustrating an example of an error notification screen UI.

FIG. 10 illustrates an example of an UI of the error notification screen displayed in step S506 in FIG. 5. On the notification screen, one error in the list illustrated in FIG. 8B is displayed. Alternatively, a plurality of errors registered in the error notification list may be collectively displayed on a single notification screen.

In a section 1001, an overview of the error is displayed. In the present exemplary embodiment, a value of the 3d-printer-state-reasons 404 or the ErrorCode 801 is displayed.

In a section 1002, detail information on the error is displayed. In the present exemplary embodiment, a value of the 3d-printer-state-reasons 404 or the Message 802 is displayed.

In a section 1003, a result of the error determination is displayed.

In a section 1004, the Position 806 is displayed as information indicating a part that might be a cause of an error.

In a section 1005, whether the item is supported, a supported range, a setting value, and a status value are displayed for each of the values of Position 806. These pieces of information are the information that has been used in the error determination processing.

With the present exemplary embodiment, a content of an error notification can be standardized for a plurality of control devices that builds a 3D object and is different from each other in determination of an error based on a status detected in the control devices and an output mode for outputting the error.

In the present exemplary embodiment, a notification of an error in a 3D printer as an example of the control device has been described above. It is to be noted that the present disclosure may be applied to another type of control device connected to a network.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-203186, filed Oct. 14, 2015, which is hereby incorporated by reference herein in its entirety.

What is claimed is:

1. A management device managing information on a plurality of control devices configured to build a three-dimensional object, the management device comprising:
   a memory storing instructions; and
   at least one processor executing the instructions causing the management device to:
   acquire, from a control device included in management targets of the management device, a status of the control device, via a network, in a case where an event indicating that a first error has occurred in the control device due to building an object is received from the control device;
   issue a notification of a content of the first error, in a case where the content of the first error indicated by the received event has been identified;
   analyze the acquired status by using an analysis system used in common for the plurality of control devices for identifying the content of the first error, in a case where the content of the first error indicated by the received event has not been identified; and
   issue a notification of a second error indicating the content of the first error as an analysis result using the analysis system.

2. The management device according to claim 1, wherein the acquired status is different from a status corresponding to an error output in accordance with an output mode of the control device from which the status has been acquired.

3. The management device according to claim 1,
   wherein, in the analysis system, it is determined whether the acquired status satisfies a predetermined condition, and
   wherein, in case where it is determined that the acquired status does not satisfy the predetermined condition, the notification including the second error corresponding to the status is issued.

4. The management device according to claim 3, wherein the predetermined condition is a condition based on setting information and capability information, the setting information indicating a setting of the control device designated when the control device builds an object, the capability information indicating a function that is related to the building of the object and is able to be provided by the control device.

5. The management device according to claim 4, wherein, in the analysis system, it is determined that the predetermined condition is satisfied when a status of a temperature of a component of the control device in the acquired status is within both a setting range of the temperature of the component in the setting information and a setting range of the temperature of the component in the capability information.

6. The management device according to claim 4, wherein, in the analysis system, it is determined that the predetermined condition is satisfied when a status of fan speed of the control device in the acquired status is within both a setting range of the fan speed in the setting information and a setting range of the fan speed in the capability information.

7. The management device according to claim 4, wherein, in the analysis system, it is determined that the predetermined condition is satisfied when a type of a consumable material, used by the control device to build an object, as the acquired status matches at least one type of the consumable material in the setting information and at least one type of the consumable material in the capability information.

8. The management device according to claim 3, wherein the issued notification not only includes the second error corresponding to the status that has been determined not to be satisfying the predetermined condition as a result of the analysis, but also includes the acquired status.

9. The management device according to claim 1, wherein the status is acquired from the control device when the management device receives an event indicating the second error output in accordance with the output mode of the control device.

10. The management device according to claim 1, wherein the instructions further cause the management device to issue a notification of the first error output in accordance with the output mode of the control device related to the acquired status.

11. The management device according to claim 1, wherein the status is acquired from the control device in accordance with a predetermined schedule.

12. The management device according to claim 1, wherein the plurality of control devices is different from each other in manufacturer or model.

13. A control method for a management device managing information on a plurality of control devices configured to build a three-dimensional object, the control method comprising:
  acquiring, from a control device included in management targets of the management device, a status of the control device, via a network, in a case where an event indicating that a first error has occurred in the control device due to building an object is received from the control device;
  issuing a notification of a content of the first error, in a case where the content of the first error indicated by the received event has been identified;
  analyzing the acquired status by using an analysis system used in common for the plurality of control devices for identifying the content of the first error, in a case where the content of the first error indicated by the received event has not been identified; and
  issuing a notification of a second error indicating the content of the first error as an analysis result using the analysis system.

14. A non-transitory computer-readable storage medium on which is stored a computer program for causing a computer to execute a control method for a management device managing information on a plurality of control devices configured to build a three-dimensional object, the control method comprising:
  acquiring, from a control device included in management targets, a status of the control device, via a network, in a case where an event indicating that a first error has occurred in the control device due to building an object is received from the control device;
  issuing a notification of a content of the first error, in a case where the content of the first error indicated by the received event has been identified;
  analyzing the acquired status by using an analysis system used in common for the plurality of control devices for identifying the content of the first error, in a case where the content of the first error indicated by the received event has not been identified; and
  issuing a notification of a second error indicating the content of the first error as an analysis result using the analysis system.

* * * * *